US007877495B2

(12) United States Patent
Stevens et al.

(10) Patent No.: US 7,877,495 B2
(45) Date of Patent: Jan. 25, 2011

(54) APPLICATION LEVELS OF SERVICE OVER A NETWORK

(75) Inventors: Gilman R. Stevens, Fairview, TX (US); Charles I. Cook, Louisville, CO (US); Thomas Schwengler, Lakewood, CO (US)

(73) Assignee: Qwest Communications International Inc., Denver, CO (US)

( * ) Notice: Subject to any disclaimer, the term of this patent is extended or adjusted under 35 U.S.C. 154(b) by 418 days.

(21) Appl. No.: 12/128,841

(22) Filed: May 29, 2008

(65) Prior Publication Data

US 2009/0296700 A1 Dec. 3, 2009

(51) Int. Cl.
G06F 15/16 (2006.01)

(52) U.S. Cl. .................. 709/229; 709/223; 709/224; 709/238

(58) Field of Classification Search ............... 709/229, 709/238, 203, 223–224
See application file for complete search history.

(56) References Cited

U.S. PATENT DOCUMENTS

| | | | |
|---|---|---|---|
| 6,091,725 A | | 7/2000 | Cheriton et al. |
| 6,798,776 B1 | | 9/2004 | Cheriton et al. |
| 7,545,752 B2 * | | 6/2009 | Krautkremer et al. ....... 370/252 |
| 7,680,922 B2 * | | 3/2010 | Rabinovitch et al. ........ 709/224 |
| 7,788,386 B2 * | | 8/2010 | Svensson ..................... 709/229 |
| 2004/0203658 A1 * | | 10/2004 | Narayanan ................ 455/414.1 |
| 2005/0165925 A1 * | | 7/2005 | Dan et al. .................... 709/224 |
| 2007/0106808 A1 * | | 5/2007 | Vemula et al. .............. 709/230 |
| 2007/0156919 A1 * | | 7/2007 | Potti et al. .................. 709/238 |
| 2007/0263541 A1 * | | 11/2007 | Cobb et al. .................. 370/235 |

OTHER PUBLICATIONS

U.S. Appl. No. 12/144,727, filed Jun. 24, 2008, Stevens, et al.
Burris, Shaun, "Effects of Real-Time Traffic Prioritization in Home Based Broadband Internet Connections," Centre for Advanced Internet Architecture^SM Swinburne University of Technology, Feb. 15, 2008, 7 pgs.

* cited by examiner

Primary Examiner—Philip B Tran

(57) ABSTRACT

Methods, systems, devices, and software are disclosed for providing application levels of service over a network. Embodiments of the invention maintain a list of registered applications (or application providers) that have registered with a network resources provider. Customers of the network resources provider may authenticate some or all of the registered applications, indicating a desire to allow traffic relating to those applications over their access networks. Customers may further set application levels of service with respect to those authenticated applications. Certain embodiments may use the registrations, authentications, service level settings, and/or other related information to generate application service level protocol data. This ASLP data may then be used to make data handling determinations for managing the flow of network traffic according to agreed service levels at the application level.

35 Claims, 11 Drawing Sheets

APPLICATION LEVELS OF SERVICE OVER A NETWORK

BACKGROUND OF THE INVENTION

Embodiments of the invention are related to the provision of telecommunication services, and in particular, to the provision of application levels of service over a network.

Many typical networks, including the Internet, may be configured as "best effort" networks. In a best effort network, each packet of information may be given substantially equal priority, such that the network may make a best effort to transmit each packet, regardless of the application from which the packet originates. This may allow a network to remain neutral to and compatible with any potential applications with which it may be used.

One result of using "best effort" protocols may be that applications may effectively "hog" limited bandwidth resources by sending and/or receiving large numbers of packets over the network. This may starve other applications of bandwidth, thereby preventing those other applications from running as desired. For example, voice over internet protocol ("VoIP") services may not run reliably while bandwidth-hogging applications (e.g., massively multiplayer online games, certain file sharing applications, etc.) are running over the same network.

Some network components (e.g., routers, residential gateways, and modems) attempt to provide certain applications minimum levels of service by allowing port-level configurations. In certain components, specific ports may be designated to send and/or receive certain types of packets and to prioritize those packets, such that a minimum level of service is maintained for those packets where possible. For example, a logical port on a router may be configured to send and receive VoIP packets with a very high priority. In this way, the router may attempt to establish a minimum level of service to VoIP packets, thereby indirectly attempting to establish a minimum level of service to any applications that send and/or receive VoIP packets.

While port-level configuration may help provide levels of service to certain types of packets, its effectiveness may be limited. One potential limit to the effectiveness of port-level configuration is that users may wish to give different levels of service to different applications using similar types of packets. If the port is configured only to detect that type of packet, there may be no way for the port to discriminate at the application level.

Another potential limit to the effectiveness of port-level configuration is that applications may easily "spoof" a network to exploit the configuration without the consent of a user. For example, massively multiplayer online games may use large amounts of bandwidth, even while the game does not appear to be running, to execute heuristics to predict future player movements, to update the game with networked information from other players and systems, to preload graphics and/or audio, etc. The game may then query a router configuration, determine that VoIP packets are being given high priority, and configure its packets to look like those high-priority VoIP packets. In this way, game traffic may look to the network like VoIP traffic, potentially starving actual VoIP traffic of bandwidth.

As such, there may be a general need in the art for providing reliable minimum application levels of service to network users.

BRIEF SUMMARY OF THE INVENTION

Among other things, embodiments of the invention include methods, systems, and apparatuses for providing reliable minimum application levels of service to network users.

In one embodiment, the invention maintains a list of registered applications (or application providers) that have registered with a network resources provider. Customers of the network resources provider may authenticate some or all of the registered applications, indicating a desire to allow traffic relating to those applications over their access networks. Customers may further set application levels of service with respect to those authenticated applications. Certain embodiments may use the registrations, authentications, service level settings, and/or other related information to generate application service level protocol ("ASLP") data. Using the ASLP information may allow the network resources provider, the customer, and/or other parties to manage network resources and provide certain application levels of service, while limiting the ability of unauthenticated applications from spoofing the network.

One set of embodiments includes a method for providing an application level of service over a network. The method includes receiving network traffic at a network routing location controlled by a service provider, wherein the network traffic originates from an application, comprises protocol data, and is configured to be sent over the network to an intended consumer, the intended consumer being a consumer of network resources provided by the service provider; deriving the application and the intended consumer from the network traffic as a function of the protocol data; determining whether an application service level relationship exists between the application and the intended consumer; and handling the network traffic at the network routing location as a function of the results of the determining step.

Another set of embodiments includes another method for providing an application level of service over a network. The method includes providing a list of registered applications to a user of network resources; receiving a request from the user to accommodate an application level of service for network traffic from a designated registered application; generating, if the request is proper, an application service level agreement based on the request between the user and the designated registered application; receiving network traffic from the network at a first network location; determining whether the network traffic is governed by the application service level agreement; and if the network traffic is governed by the application service level agreement: formulating application routing data as a function of the application service level agreement and an application service level protocol; and routing the network traffic over the network from the first network location to a second network location according to the application routing data.

Yet another set of embodiments includes a system for providing an application level of service over a network. The system includes a receiver unit, operable to receive network traffic from the network, wherein the network traffic originates from at least one of a set of registered applications and is destined for an intended user; and a network management unit, operable to determine whether the network traffic is governed by an application service level relationship between the at least one registered application and the intended user, formulate application routing data as a function of the application service level relationship and an application service level protocol, and route the network traffic over the network at least partially as a function of the application routing data.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION OF THE INVENTION

Figure 1:
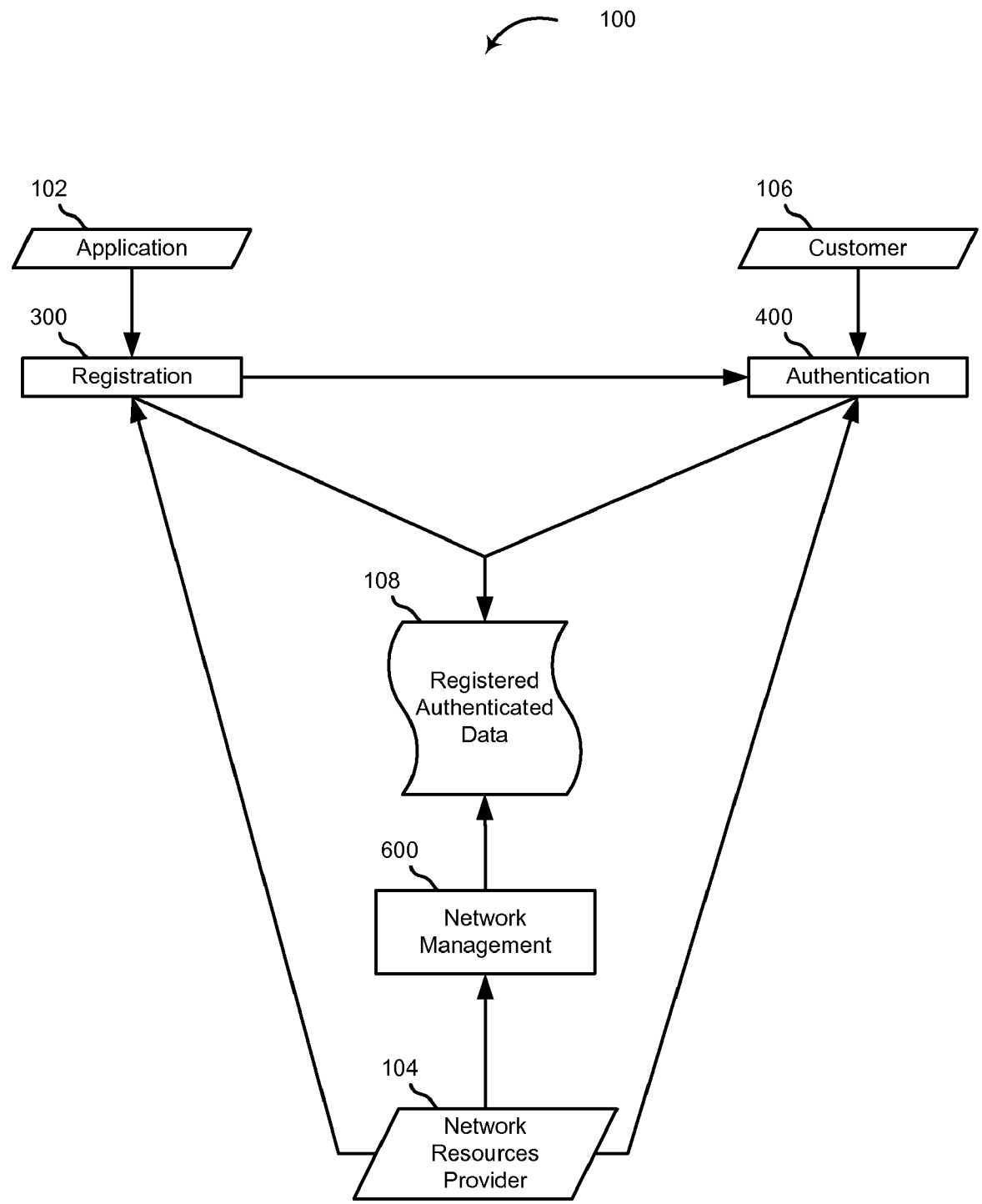
FIG. 1 shows a simplified data flow diagram for providing application levels of service ("ALS") over a network, according to various embodiments of the invention.

Embodiments of the invention provide reliable minimum application levels of service to network users. Various embodiments provide methods, systems, and apparatuses for providing such services through application authentication protocols. Using application authentication protocols may allow participants to reliably handle levels of service at the application or sub-application level.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments are described with reference to the Internet, embodiments of the invention may be implemented in any network.

Many typical networks, including the Internet, may be configured as "best effort" networks. In a best effort network, each packet of information may be given substantially equal priority, such that the network may make a best effort to transmit each packet, regardless of the application from which the packet originates. On one hand, this may allow a network to remain neutral to and compatible with any potential applications with which it may be used. In general, much Internet policy has been concerned with maintaining this so-called network neutrality over the public Internet.

On the other hand, some types of information may be more sensitive than others to network resource limitations, like limited bandwidth and delays. For example, quality of service ("QoS") for some voice over internet protocol ("VoIP") applications may be impacted by network characteristics, like latency, jitter, and packet loss. In certain of these applications, where information is communicated in multiple directions (e.g, in a two-way communication), the impacts may be experienced on both the uplink and downlink channels of the network link. As such, ensuring levels of service (e.g., QoS) for certain applications may be difficult in a best effort network like the Internet.

Moreover, some modern applications have found ways to exploit the best effort nature of the Internet and other networks to effectively "hog" limited bandwidth resources. In some cases bandwidth may be hogged simply by sending and/or receiving large numbers of packets over a network. This may starve other applications of bandwidth, thereby preventing those other applications from running as desired. For example, voice over internet protocol ("VoIP") services may not run reliably while bandwidth-hogging applications (e.g., massively multiplayer online games, certain file sharing applications, etc.) are running over the same network.

Some network components (e.g., routers, residential gateways, and modems) attempt to provide certain applications minimum levels of service by allowing port-level configurations. For example, a logical port on a router may be configured to send and receive packets designated by a VoIP header with a very high priority. In this way, the router may attempt to tilt levels of service in favor of VoIP packets, at least from the router to the next network switch or router.

While port-level configuration may help provide levels of service to certain types of packets, its effectiveness may be limited. One potential limit to the effectiveness of port-level configuration is that users may wish to give different levels of service to different applications using similar types of packets. If the port is configured only to detect that type of packet, there may be no way for the port to discriminate at the application level.

Another potential limit to the effectiveness of port-level configuration is that applications may easily "spoof" a network to exploit the configuration without the consent of a user. For example, a massively multiplayer online game may desire to use large amounts of bandwidth, even while the game does not appear to be running, to execute heuristics to predict future player movements, to update the game with networked information from other players and systems, to preload graphics and/or audio, etc. The game may query a router configuration (e.g., by locally or remotely detecting port settings), determine that packets with VoIP headers are being given high priority, and configure its packets to include VoIP information in the headers so as to look like those high-priority VoIP packets. In this way, game traffic may appear to be VoIP traffic from the router's standpoint, potentially starving actual VoIP traffic of bandwidth. As such, it may be desirable to provide levels of service for application-level network traffic, while limiting the ability of applications to spoof the network.

It will be appreciated that the phrase "application level of service" and its acronym "ALS" may be used herein to refer generally to any type of network service level metric. For example, ALS may refer to bandwidth reservation, quality of service ("QoS"), class of service ("CoS"), or terms of service ("ToS"). Further, providing ALS over a network may refer to providing minimum, maximum, adjustable, specific, or any other type of levels of service to applications. Even further, providing ALS may include providing levels of security along with the various other ALS functions. For example, bandwidth reservation may include securely reserving bandwidth by application.

It will be further appreciated that, while various embodiments are illustrated with application data flowing from an application to an intended end user, the same or similar inventive concepts described herein are applicable to any other data flows throughout a network. For example, similar functionality may be applicable to handling applicant data sent from an end user to an application provider, from one network component to another network component (e.g., one aggregator to another aggregator), etc. Further, it may be desirable to handle multidirectional data flows for certain applications (e.g., both upstream and downstream data traffic for a VoIP call). As such, descriptions of data flows from applications to end users should not be construed as limiting the scope of the invention.

Among other things, embodiments of the invention provide methods, systems, apparatuses, and software for handling ALS over a network, while minimizing network spoofing and/or other network management and design issues. FIG. 1 shows a simplified data flow diagram for providing ALS over a network, according to various embodiments of the invention. The data flow 100 includes a registration process 300, an authentication process 400, and network management processes 600.

In some embodiments, the data flow 100 begins when an application 102 goes through a registration process 300 to become a registered application. In certain embodiments, the registration process 300 is provided by, controlled, and/or performed with a network resources provider 104. The application 102 may be any type of application that communicates application data (e.g., streaming data, real-time data, files, cached data, etc.) to an end user over a network. For example, the application 102 may relate to email, online gaming, VoIP, file sharing, e-commerce, Internet protocol television ("IPTV"), or any other network usage.

Some time after the application 102 completes the registration process 300, a customer 106 may perform an authentication process 400 to authenticate the application 300. In certain embodiments, the registration process 300 is provided by, controlled, and/or performed with a network resources provider 104. The customer 106 may be a customer of the network resources provider 104 (e.g., the network resources provider 104 may provide network services to the customer 106). By completing the authentication process 400, the application 102 may become authenticated. This may indicate to the network (e.g., to the network resources provider 104) that the customer 106 desires to receive network traffic from the application 102 at a certain ALS (e.g., greater than some minimum QoS). This network traffic may then be treated as registered authenticated data 108 as it flows through all or a portion of the network. It will be appreciated that some or all of the registration and/or authentication processes may include security. For example, it may be desirable to provide secure registration of applications or secure authentication of securely registered applications.

In some embodiments, the network resources provider 104 constantly performs network management processes 600. These network management processes 600 may include handling (e.g., routing) of various types of network traffic. In certain embodiments, the network management processes 600 include processes for handling the registered authenticated data 108 according to various conditions. The conditions may include information from the registration and/or authentication processes, network characteristics, time of day, multiple applications competing for network resources, etc.

By handling the registered authenticated data 108 with specific network management processes 600, it may be possible to prevent unregistered or unauthenticated applications 102 from spoofing the network. For example, even a registered application 102 may be unable to send data to a customer 106 at a certain ALS without first being authenticated by the customer 106. As such, it will be appreciated that the data flow 100 may provide customers 106 with the capability to set ALS for desired applications 102, while limiting the ability of undesired applications 102 to spoof the network.

Figure 2:
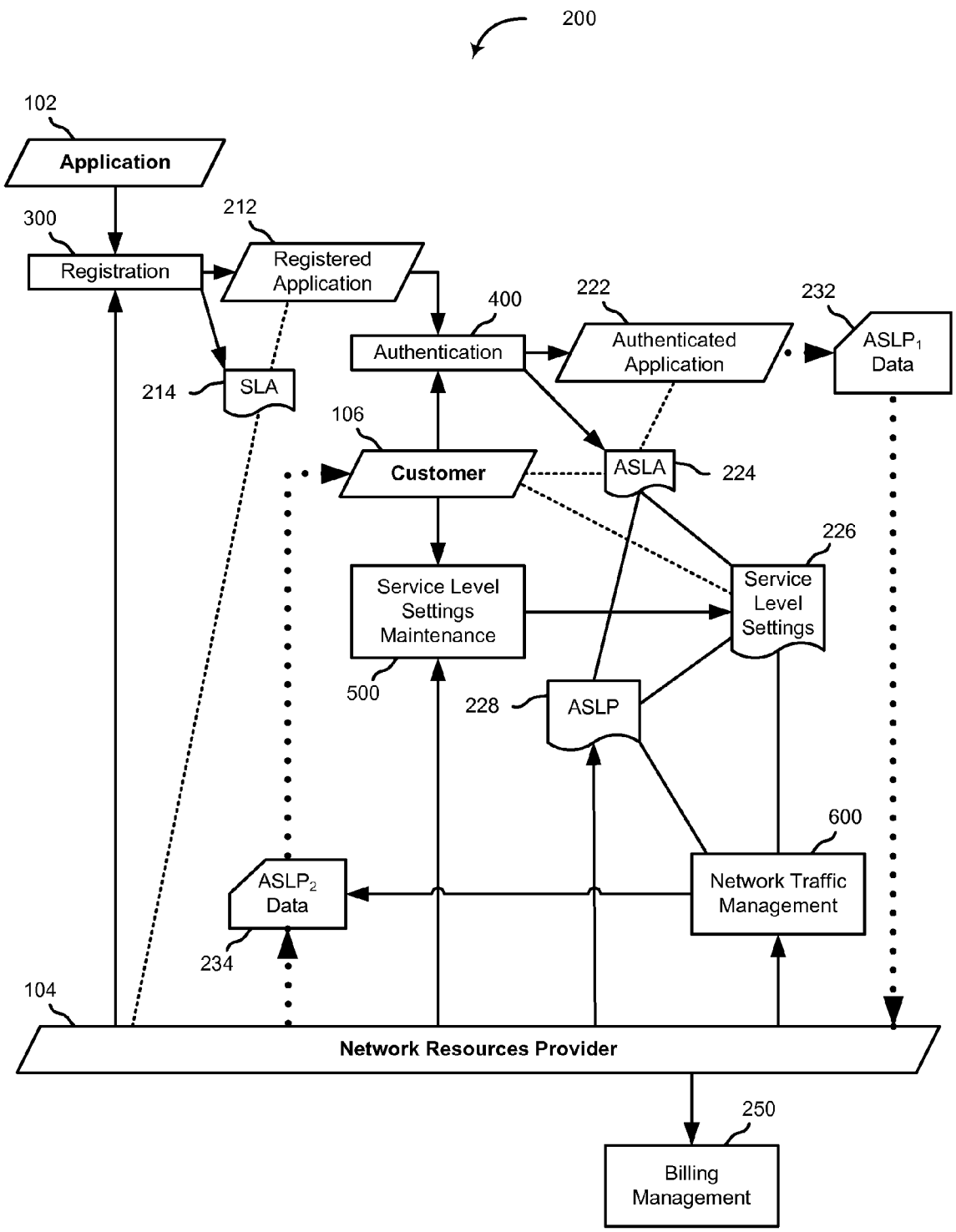
FIG. 2 shows another data flow diagram for providing ALS over a network, according to various embodiments of the invention.

FIG. 2 shows a more detailed embodiments of a data flow diagram for providing application levels of service over a network, according to various embodiments of the invention. As in FIG. 1, the data flow 200 includes a registration process 300, an authentication process 400, and network management processes 600. Dashed lines may indicate illustrative parties to an agreement, and solid lined with no arrowheads may indicate illustrative data usage by a process.

Embodiments of the data flow 200 begins when an application 102 completes a registration process 300 to become a registered application 212. In certain embodiments, the registration process 300 is provided by, controlled, and/or performed with a network resources provider 104. In various embodiments, the registration process 300 may be performed at the application level, application type level (e.g., voice communications, file sharing, online gaming, IPTV, etc.), application provider level, sub-application level (e.g., the heuristics or video pre-loading modules of an online gaming application), or any other useful level. For example, an application provider may register some or all of its applications, or an application may register some or all its sub-applications.

Figure 3:
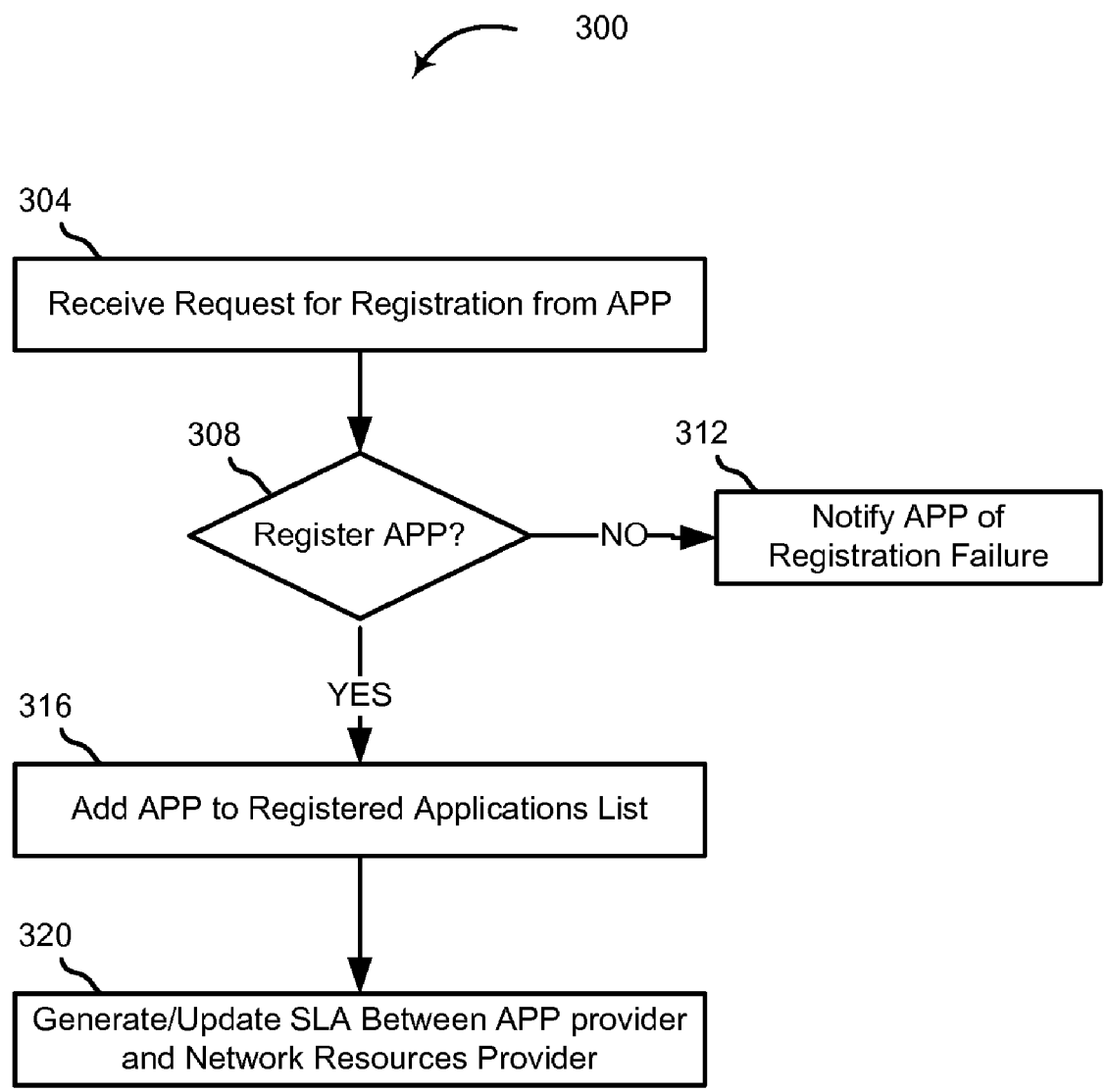
FIG. 3 shows an illustrative embodiment of a registration process, according to various embodiments of the invention.

FIG. 3 shows an illustrative embodiment of a registration process 300, according to various embodiments of the invention. Embodiments of the registration process 300 begin at block 304 when an application requests to become a registered application. In some embodiments, the application provider submits a registration request to a network resources provider, for example, electronically or by mail. In certain embodiments, a registration network portal is provided to allow applications or application providers to register electronically over the network (e.g., the Internet).

The registration request received at block 304 may succeed or fail at block 308. Where the registration fails, some embodiments of the registration process 300 notify the application of the registration failure at block 312. In some cases, the registration failure may result from a denial of the registration request. For example, the network resources provider may determine that the application tends to overuse or misuse certain network resources, or that it would be undesirable or unprofitable to register the application for some reason (e.g., for competitive reasons). In other cases, the failure may relate to network constraints or failures, account issues, or other reasons.

Where the registration succeeds, the application may be approved as a registered application. In some embodiments, the registered application is added to a list of registered applications in block 316. The list of registered applications may be maintained, for example, in a data storage unit (e.g., a server). In certain embodiments, the list of registered applications is maintained by the network resources provider.

In certain embodiments, the registration process 300 continues at block 320 with updating or generating a service level agreement ("SLA"). In some embodiments, the SLA is generated to control one or more aspects of the relationship between the application provider and a third party service provider, like the network resources provider. For example, the application may register with a party responsible for a number of access network (e.g., "last mile") connections between end customers and a first network access point. In one embodiment, the registration request received at block 304 is not approved at block 308 until the terms of an SLA have been agreed to by its parties (e.g., the application provider and the network resources provider).

Returning to FIG. 2, it will now be appreciated that embodiments of the registration process 300 (e.g., the registration process 300 of FIG. 3) may allow the application 102 to become a registered application 212. It will be further appreciated that embodiments of the registration process 300 may generate or update an SLA 214 between the now-registered application (or the application provider) and the network resources provider 104. In this way, the registration process 300 may be used to effectively certify the application 102 as a trusted application.

Figure 4:
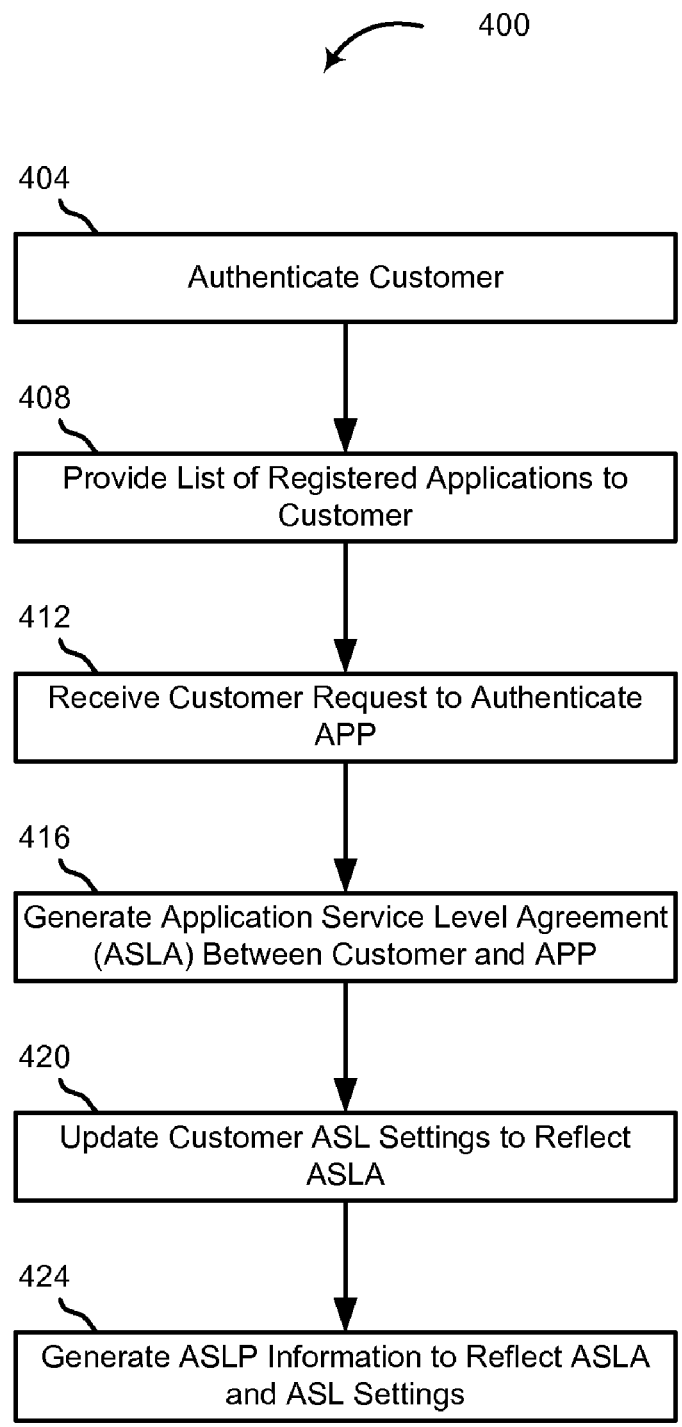
FIG. 4 shows an illustrative embodiment of an authentication process, according to various embodiments of the invention.

Even where the application 102 is a registered application 212, it may be desirable for the customer 106 to be able to set a certain ALS and/or other service level settings relating to the registered application 212. In some embodiments of the data flow 200, the customer 106 engages in an authentication process 400 to authenticate the registered application 212 as an authenticated application 222. FIG. 4 shows an illustrative embodiment of an authentication process 400, according to various embodiments of the invention.

Some embodiments of the authentication process 400 begin at block 404 by authenticating the customer. In certain embodiments, the authentication process 400 receives login information from the customer, allowing the customer access to certain customer account information. For example, the authentication process 400 may be provided via a network portal (e.g., over the Internet), which requires an account identifier (e.g., a user name) and a password.

Once the customer is authenticated, embodiments of the authentication process 400 provide the customer with a list of registered applications at block 408. It will be appreciated that the list may be provided in any useful way. In one embodiment, the list is provided as a table, the table showing all the available registered applications and associated relevant information (e.g., whether the application has been previously authenticated, a description of the application, a description of the applications network usage, etc.). In another embodiment, the customer is provided with the capability to process (e.g., search, sort, filter, etc.) the list, such that records from the list are provided as processed results. For example, the customer may search for all home-office-related applications that have not been registered, sorted by customer rating. In still another embodiment, preset configurations may be offered as choices for the customer, allowing the customer to make macro-level ALS decisions. For example, the customer may choose a "home-office" profile that has been predefined (e.g., by the customer, the network resources provider, an application provider, the customer's employer, etc.) to simultaneously authenticate multiple applications with particular ALSs and other service level settings.

In some embodiments, the authentication process 400 continues at block 412 by receiving a customer request to authenticate one or more applications. It will be appreciated that the request may be received in a number of ways according to the invention. In one embodiment, the request is received electronically via the provided network portal. In other embodiments, the request is received electronically by some other way (e.g., email) or by mail. Further, the receipt of the request may relate to the form in which the list of registered applications was provided in block 408. For example, where the customer is provided with macro-level options, the request may be received as a macro-level request (e.g., to authenticate multiple applications in one request).

In some embodiments, authentication request in block 412 results in updating or generating an application service level agreement ("ASLA") between the customer and the application or application provider at block 416. The creation of the ASLA may include generating a set of ASLA terms and conditions or other elements of the agreement. In some embodiments, the ASLA includes minimal information, for example, the parties to the agreement. In other embodiments, the ASLA further includes certain service level settings relating to the application (e.g., service level settings). In one example, the service level settings indicate that traffic relating to the customer's VoIP provider should receive the highest priority of all network traffic on the customer's access network at all times of day. In another example, the service level settings indicate that traffic relating to the customer's VoIP provider should be guaranteed a minimum QoS at all times.

Some embodiments of the ASLA provide an individualized ASLA for each customer-application pair. In other embodiments, the ASLA is implemented as one or more records in a relational database. For example, a data record may exist for each customer, including attributes relating to which applications have been authenticated by the customer, other service level settings, etc. Alternately, a data record may exist for each registered application, including attributes relating to which customers have authenticated the application. It will be appreciated that many types of SLAs and ASLAs are possible according to the invention. In fact, various embodiments of the invention may support any type of multilateral agreement process by which a customer may authenticate an application. In some embodiments, the agreement are bilateral (e.g., through an ASLA); in other embodiments, the agreements are trilateral (e.g., by combining the third-party registration and SLA process with the ASLA); and in still other embodiments, various SLAs and ASLAs are combined to create multilateral agreements (e.g., by combining an SLA between a two network service providers with an SLA between one of the network service providers and an application provider and further with an ASLA between the application provider and a customer.

In some embodiments of the authentication process 400, other service level settings are received at block 420. For example, the customer may have service level settings which are or are not related to specific ASLAs. Some or all of the information from the ASLA and/or other service level settings may be used in block 424 to generate or update application service level protocol ("ASLP") information. It will be appreciated that network traffic may generally be configured according to one or more protocols (e.g., the TCP/IP protocol). These protocols may essentially handle (e.g., control) the communication of information between nodes of the network by defining and interpreting certain rules understood by those nodes. The rules may relate, for example, to syntax, encryption, synchronization, error correction, etc. The ASLP refers to a protocol for providing application levels of service over a network.

It will be appreciated that the term "protocol" as used herein is intended to generally describe any set of data useful for facilitating data handling over a network. In some embodiments, the ASLP is compatible with standard network protocols. In one embodiment, the ASLP is compatible with the TCP/IP protocol, a standard Internet protocol. The TCP/IP protocol may generally include a header portion, a data portion, and a tail portion. The header portion may include space that is reserved for certain information (e.g., error correction bits), and other space that is open for certain optional information. In the optional information space, it may be possible to include ASLP bits for handling application service levels.

In another embodiment, the ASLP bits are incorporated into data portions of other datagrams. For example, a standard network protocol may include a data portion for communicating application data. Within the data portion, it may be desirable to insert another datagram. In one embodiment, the ASLP defines the bit string in the data portion of an IP datagram. For example, the first twenty-four bits of the data portion may include bits representing the application provider and/or the intended user.

In yet another embodiment, the ASLP bits may be inferred from network traffic (e.g., from data signatures within a data packet). For example, techniques, like those used in deep packet inspection, may be used to guess at a likely source application for data traffic on the network. The techniques may, for example, analyze patterns of data looking for patterns that are characteristic to certain applications, or look for source-identifying data inserted into the traffic by the application (e.g., for trademark, branding, copyright, tracking, or other reasons).

Returning to FIG. 2, it will now be appreciated that embodiments of the authentication process 400 (e.g., the authentication process 400 of FIG. 4) may allow the registered application 212 to become an authenticated application 222. It will be further appreciated that embodiments of the authentication process 400 may generate or update an ASLA 224 between the now-authenticated application (or the application provider) and the customer 106, generate or update other service level settings 226 relating to the customer's network management, and generate or update ASLP 228 information for use in handling network traffic between the application 102 and the customer 106. As such, a relationship may now be defined that effectively certifies the application 102 from the standpoint of both the customer 106 and the network resources provider 104.

Some embodiments of the data flow 200 include a service level settings maintenance process 500 that is separate from the authentication process 400. Some embodiments of the service level settings maintenance process 500 allow the network resources provider 104 to modify service level settings 226 for a customer 106. For example, the network resources provider 104 may upgrade certain options, provide different functionality based on account changes, provide different functionality based on network infrastructure changes, or modify the service level settings 226 of the customer 106 for any other reason. Other embodiments of the service level settings maintenance process 500 allow the customer 106 to access and/or change its own service level settings 226.

Figure 5:
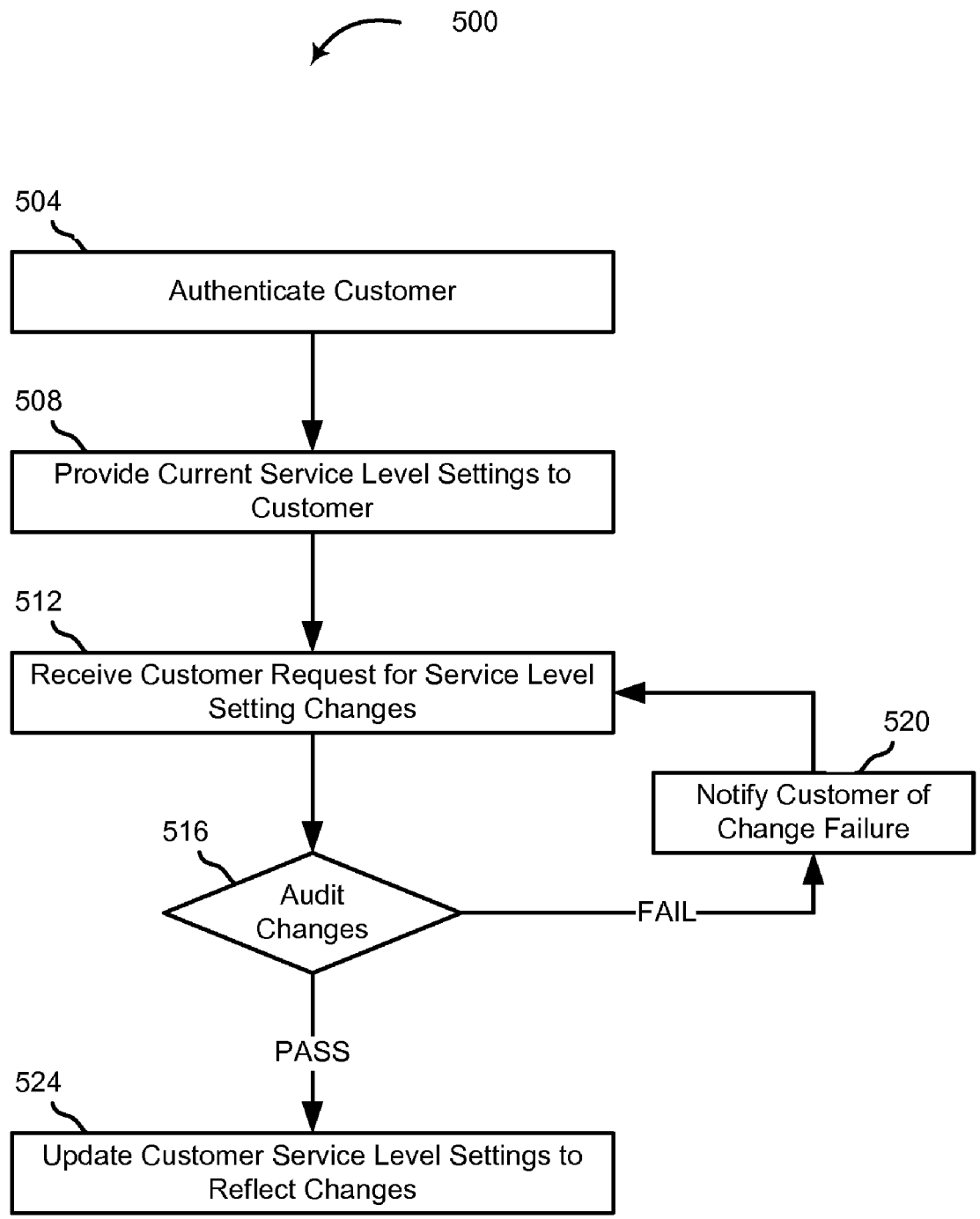
FIG. 5 shows an illustrative embodiment of a customer-initiated service level settings maintenance process, according to various embodiments of the invention.

FIG. 5 shows an illustrative embodiment of a customer-initiated service level settings maintenance process 500, according to various embodiments of the invention. It is worth noting that a customer's service level settings may be stored and/or implemented in a number of ways. In some embodiments, the service level settings include data stored on a data storage device that may be queried by one or more components of the network. For example, a DSLAM may query the data storage device to determine whether the customer has set priorities relating to a particular application. In other embodiments, the service level settings may include physical or virtual settings of network components. For example, the service level settings may include port settings for a customer's home router. In certain of these embodiments, the customer service level settings can be handled (e.g., updated, modified, etc.) remotely. For example, a network resources provider may control service level settings relating to a customer's DSL modem using an automatic configuration server ("ACS") by transmitting information over the access network (e.g., TR-069 commands).

Embodiments of the service level settings maintenance process 500 begin at block 504 by authenticating the customer (e.g., in a similar way to the authentication of the customer in block 404 of FIG. 4. For example, a network portal may be provided for performing the service level settings maintenance process 500, which receives a login identifier and password to authenticate the customer. In some embodiments, the customer's current service level settings are provided to the customer at block 508. In some cases, for example where the customer has never modified its service level settings, the service level settings provided to the customer may include default service level settings. In one embodiment, the default service level settings are set by the network resources provider. In various embodiments, some service level settings may relate to specific ASLAs, while other service level settings may not be related to specific ASLAs. For example, the customer's service level settings may relate to the customer's account (e.g., payment history, account restrictions, content entitlement, maximum bandwidth allocations, etc.), the customer's network characteristics (e.g., a measured level of latency, traffic, usage, etc.; customer premises equipment settings and capabilities; customer intranet settings; etc.), the customer's preferences (e.g., what types of applications the customer prefers, at what times of day the customer uses them, etc.); or any other useful type of service level setting.

The service level settings maintenance process 500 may then receive a request from the customer at block 512 to modify its current service level settings. In one example, a customer homeowner may set its service level settings to allocate certain amounts of bandwidth to certain types of applications at certain times of day. During the homeowner's workday (e.g., from nine o'clock each morning until four o'clock each afternoon), the service level settings indicate that certain home-office applications receive the largest relative bandwidth allocation in the access network. From four o'clock until six o'clock each afternoon, when the homeowner's children return home from school, their favorite multi-player online game receives the largest relative bandwidth allocation in the access network. From six o'clock until midnight each evening, when the homeowner's family tends to watch television together, traffic from a number of IPTV applications receive the largest relative bandwidth allocation in the access network. At all other times of day, the service level settings provide default bandwidth allocations to all applications (e.g., the network is treated as a best effort network, is managed according to a default or preset profile, or is managed based on some other heuristic).

In certain embodiments, the request for changes to the service level settings received at block 512 is audited at block 516 to determine whether the request is proper. In one embodiment, the audit analyzes the form of the request to determine whether it may be accurately interpreted by the service level settings maintenance process 500. In another embodiment, the content of the request is audited to determine whether the request is possible according to certain network limitations (e.g., whether a requested bandwidth allocation exceeds the maximum bandwidth available to the customer, certain service level settings are incompatible with other service level settings, etc.). In still another embodiment, the content of the request is audited to determine whether it is compliant with certain account limitations (e.g., only a certain number of changes are allowed per day, only certain service level settings may be changed, etc.).

When the audit in block 516 fails, some embodiments of the service level settings maintenance process 500 notify the customer of the failure in block 520. When the audit in block 516 succeeds, some embodiments of the service level settings maintenance process 500 change the customer's service level settings in block 524 to reflect the customer's request (e.g., by updating information stored at a storage device or by sending commands from an ACS). In certain embodiments, the customer's request received at block 512 may be interpreted and/or modified by the service level settings maintenance process 500 to comply with certain parameters. This interpretation and/or modification of the request may be in addition to or in lieu of the auditing step at block 516. In one example, the service level settings maintenance process 500 parses a plain language request to generate a formatted request that may properly be audited at block 516 and/or carried out at block 524. In another example, the service level settings maintenance process 500 interprets a pattern of service level settings change requests to better generate certain heuristics.

Returning to FIG. 2, it will now be appreciated that embodiments of the service level settings maintenance process 500 (e.g., the service level settings maintenance process 500 of FIG. 5) may allow the customer 106 to maintain its service level settings 226. It will be further appreciated that certain embodiments of the ASLA 224, ASLP 228, and service level settings 226 may share information, be based on one another, or be related in any other useful way. In some embodiments of the data flow, some or all of the information in the ASLA 224, ASLP 228, and/or service level settings 226 may then be used in managing (e.g., routing, handling, etc.) network traffic between the application 102 and the customer 106 (e.g., as managed by the network resources provider 104).

Figure 6:
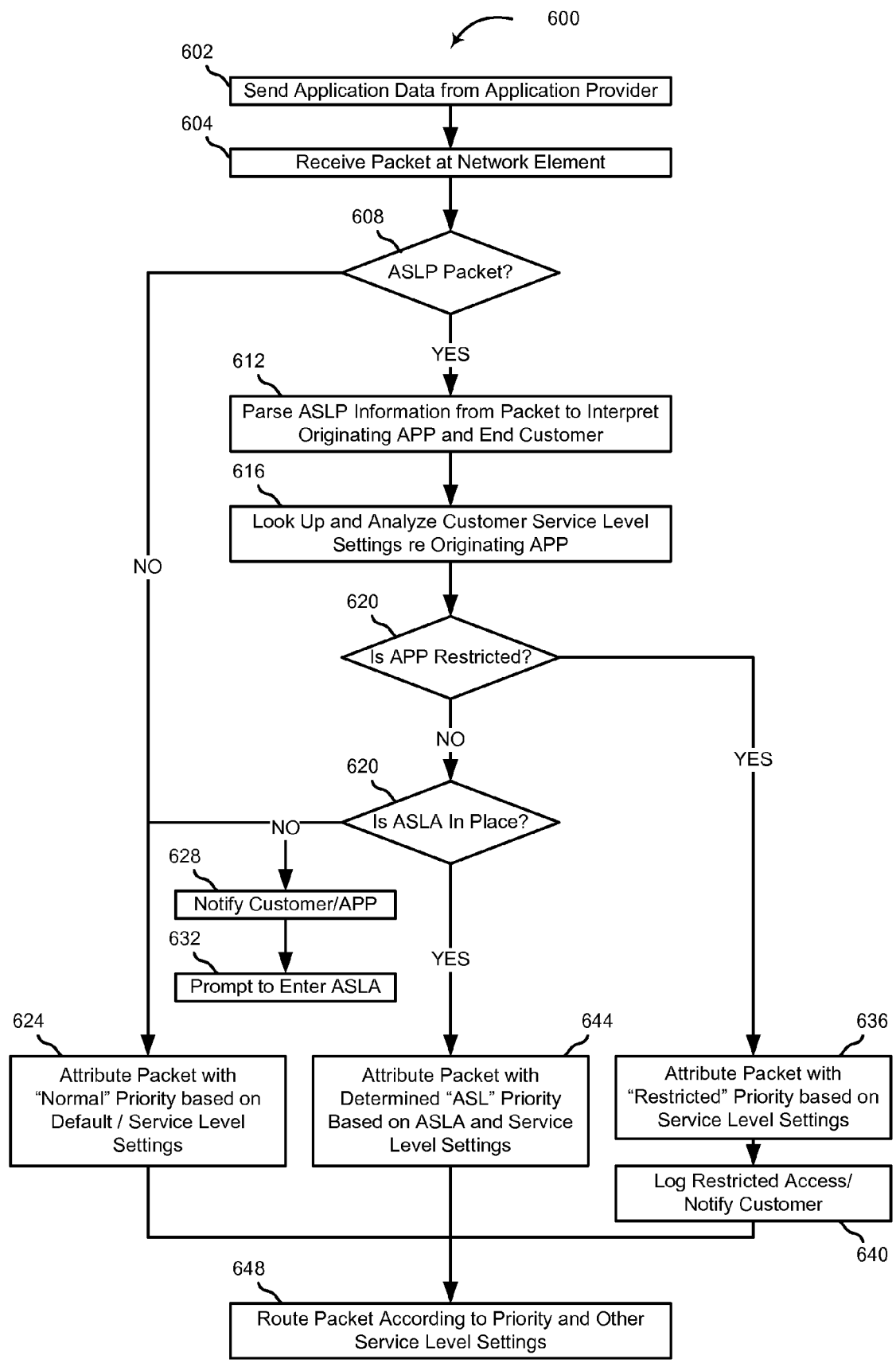
FIG. 6 shows an illustrative embodiment of a network traffic management process, according to various embodiments of the invention.

FIG. 6 shows an illustrative embodiment of a network traffic management process 600, according to various embodiments of the invention. While network management may be constantly occurring in a network, for clarity of description, embodiments of the network traffic management process 600 are considered to begin at block 602 when an application 102 begins transmitting application data to a customer 106 over a network. The data transmission may include configuring application data to be sent to the customer according to certain ASLP standards. In some embodiments, packets of application data are configured to include ASLP information, for example, in each packet's header.

The ASLP information may identify the originating application provider and the intended end customer of the application data. In some cases, the ASLP information may further identify one or more network resources providers (e.g., if that is important for managing data flow, tariffs, and other issues across a network involving multiple resource provider partners). In other cases, the ASLP information includes other types of information, for example, relating to terms and conditions of the ASLA with the intended end customer. In certain embodiments, the ASLP defines certain algorithms for generating the ASLP information. For example, the ASLP may require certain contents of a bit string, certain bit lengths for particular information, certain encryption algorithms, certain error correction algorithms, certain amounts of data redundancy, etc.

At block 604, the network traffic management process 600 receives the network traffic sent in block 602. For example, packets of information may be received at a network element or other network node (e.g., a switch, a DSLAM, a head-end, etc.). The network traffic management process 600 may then determine at block 608 whether the network traffic includes ASLP information (e.g., if the packet is compatible with the ASLP). In some embodiments, if the received traffic does not include ASLP information, the network traffic management process 600 will treat the traffic in some predetermined or default way at block 624. For example, the packet may be given "normal" or "default" priority. In other embodiments, non-ASLP traffic may be handled differently, for example, by being blocked, rerouted, tagged, given low priority, etc.

If the network traffic is determined at block 608 to include ASLP information, the ASLP information may be parsed, or otherwise processed, from the traffic at block 612. Parsing the ASLP information from the data packets may allow the network traffic management process 600 to interpret its contents. For example, the interpretation may reveal the application provider from which the data packets originated and the intended customer to which the data packets are destined. In certain embodiments, the determination in block 608 may include a determination of whether the ASLP information is proper. For example, the ASLP information may be incorrect in content or syntax, potentially preventing reliable interpretation of the data.

It will be appreciated that the ASLP may be configured such that only registered applications could generate proper ASLP information (e.g., through encryption keys, etc.). As such, a determination that the ASLP information is improper may indicate that the originating application provider is not registered. As a corollary, in some embodiments, a determination that the ASLP information is proper may indicate that the originating application provider is registered.

In some embodiments, the interpreted information is used at block 616 to analyze what, if any, service level settings and/or agreements are in place with respect to the originating application provider. One possible service level setting includes whether an application is restricted. In certain embodiments, the network traffic management process 600 determines whether the application is a restricted application at block 620. In one embodiment, the network traffic management process 600 may determine that the originating application provider is not registered. Where the application is not registered, the network traffic management process 600 may treat the traffic in some predetermined or default way at block 624.

In another embodiment, network resources providers and/or the customers are provided with functionality to block or otherwise restrict traffic from certain types of application providers. As such, a determination that the application is restricted may require treating the application-related traffic in some restricted way. For example, a network resource provider may wish to block certain file sharing applications, either completely, at certain times of day, based on certain network conditions, after a certain quota of traffic has been reached, etc. In this and other examples, it may be desirable to restrict the application-related traffic, for example, by attributing packets with one or more "restricted" tags or priority settings at block 636. In certain embodiments, when traffic is identified as originating from a restricted application, the network traffic management process 600 logs certain events (e.g., records the restricted application's attempt to send information to the customer) and/or notifies the customer of the traffic at block 640. In one embodiment, notifying the customer includes giving the customer the option to remove or modify the restrictions.

In some embodiments of the network traffic management process 600, a determination is made at block 620 of whether an ASLA is in place between the originating application provider and the intended customer. Where no ASLA is in place, the network traffic management process 600 may treat the traffic in some predetermined or default way at block 624. In certain embodiments, when no ASLA is in place, the network traffic management process 600 logs certain events (e.g., records the traffic not under an ASLA) and/or notifies the customer or the originating application provider of the non-ASLA traffic at block 628. In other embodiments, when no ASLA is in place, the network traffic management process 600 gives the customer the option to enter into an ASLA (i.e., to authenticate the application) at block 632. Where a proper ASLA is in place, embodiments of the network traffic management process 600 determine the terms and conditions of the ASLA and any other service level settings at block 644, and attribute the traffic accordingly.

Once the ASLP information has been interpreted to determine the appropriate conditions for handling the network traffic, embodiments of the network traffic management process 600 then manage the network traffic according to those determinations in block 648. In some embodiments, the network traffic management process 600 is performed at a network element (e.g., a switch, a DSLAM, a router, etc.) controlled by a network resources provider. In certain of these embodiments, the packet of information is received at the network element with certain ASLP information and routed with different ASLP information. For example, an incoming data packet may include ASLP bits implemented as an encrypted bit string. The bit stream may contain information from which it is possible to verify or reconstruct the application from which the packet originated, the end customer to whom the packet is intended, and a portion of the data included in the packet. This information may be used, as described above, to determine how the traffic should be handled (e.g., whether an ASLA is in place). Based on the determination, new ASLP bits may be generated and incorporated into the data packet, indicating the proper rules for handling the data packet once the packet is received by the next network element (e.g., the customer's modem, residential gateway, or router). It will be appreciated that managing the traffic according to the ASLP at block 648 may include routing or re-routing data, blocking transmission of data, logging transmission of data, altering data, otherwise handling the data, etc.

Returning to FIG. 2, it will now be appreciated that embodiments of the network traffic management process 600 (e.g., the network traffic management process 600 of FIG. 6) may allow the network resources provider 104, or another party, to manage network resources with ALS provisions. As shown in FIG. 2, the authenticated application 222 may communicate data over the network having a first set of ASLP information (e.g., an encrypted bit string in the packet headers designating the originating application provider and the intended end customer), designated as $ASLP_1$ Data 232. The $ASLP_1$ Data 232 may, at some point in its network transmission, reach a network element (e.g., a network access point or switch) controlled by the network resources provider 104. Through the network traffic management process 600, the network resources provider 104 may interpret the $ASLP_1$ Data 232, determine appropriate data handling actions according to the ASLP, and generate data with a second set of ASLP information (e.g., an encrypted bit string in the packet headers indicating certain data handling commands for interpretation by the network element), designated as $ASLP_2$ Data 234. The $ASLP_2$ Data 234 may then be routed to the intended end customer 106, where and as appropriate. The $ASLP_1$ Data 232 and or the $ASLP_2$ Data 234 may be the registered authenticated data 108 of FIG. 1.

In some embodiments of the data flow 200, a billing management process 250 is included to handle various billing functions. In various embodiments, the billing functions may apply to any or all of the methods of FIGS. 3-6, or other billing relationships. In one embodiment, the billing management process 250 handles billing of applications for registration and use of the ASLP handling functionality of the data flow 200. In another embodiment, the billing management process 250 handles billing of customers for authentication of application data and for using the ASLP handling functionality of the data flow 200. In still other embodiments, the billing management process 250 handles billing of other network resources providers for performing ASLP handling functions (e.g., in the form of tariffs for data trafficking and/or shaping, licenses for using ASLP handling functions, maintenance fees for purchasing ASLP handling components and/or functionality, etc.). It will be appreciated that many other types of billing arrangements are possible, some or all of which may be handled by the billing management process 250. For example, other billing functionality may include billing for customer or application data handling (e.g., storage, retrieval, buffering, caching, processing, etc. of data relating to registration, authentication, ASLAs, SLAs, service level settings, etc.), billing for data routing (e.g., per packet, per type of packet, per logical pipe allocation, etc.), billing for certain service levels (e.g., types of functions available, number of levels available, types of guarantees available, etc.), or any other useful billing functions.

Figure 7:
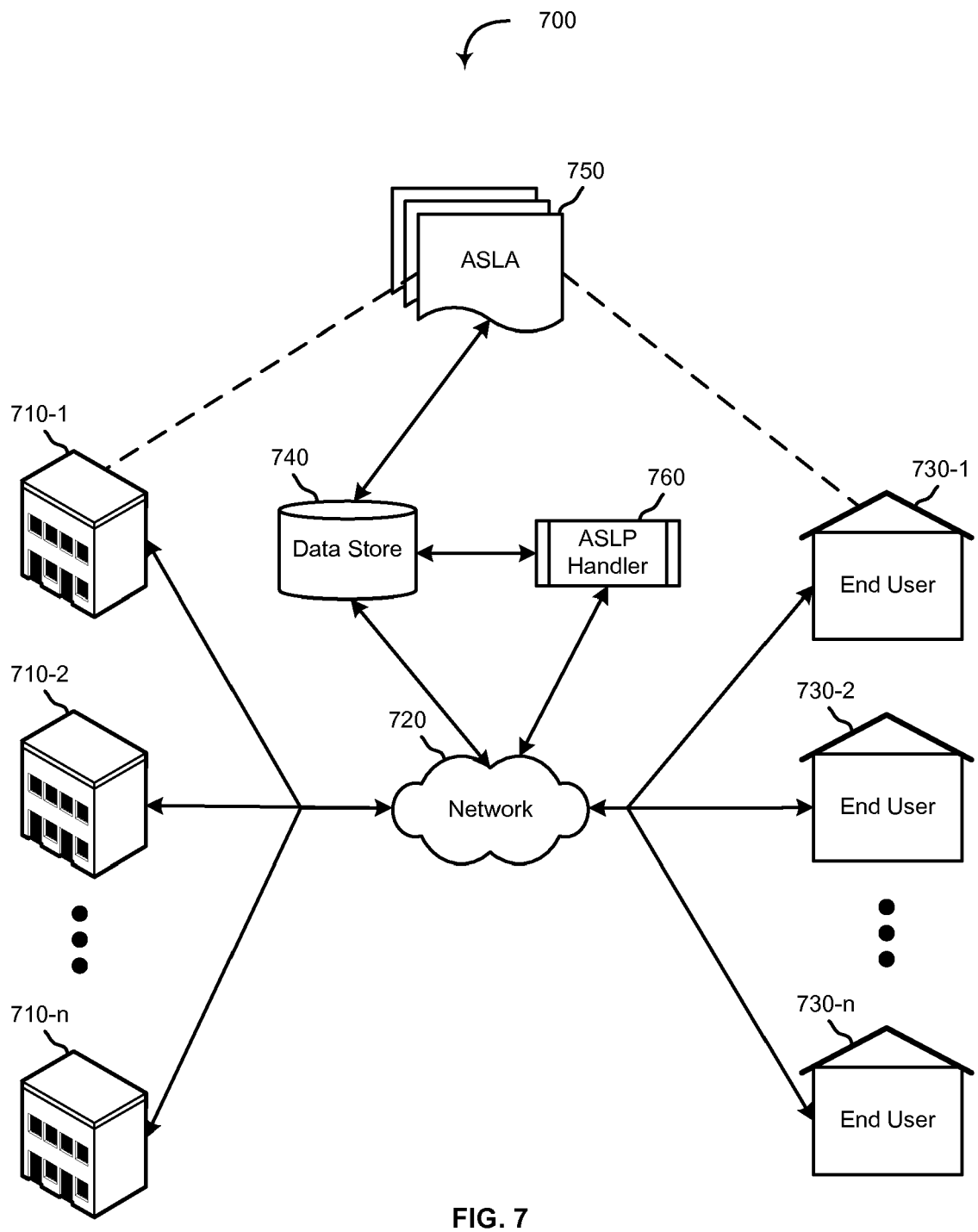
FIG. 7 shows a simplified system diagram of an illustrative system for providing ALS over a network, according to various embodiments of the invention.

It will be appreciated that embodiments of the invention, including the embodiments described with reference to FIGS. 1-6 may be implemented in various types of systems, apparatuses, and/or software. FIG. 7 shows a simplified system diagram of an illustrative system for providing ALS over a network, according to various embodiments of the invention. The system 700 includes a number of application providers 710 and a number of end customers 730 communicating application data over a network 720.

According to the illustrated embodiment, one of the application providers 710-1 and one of the end customers 730-1 are parties to one or more ASLAs 750. The other application providers (720-2-720-n) have no ASLA in place with any of the end customers 730. As such, some data traffic over the network 720 will be ASLP data (i.e., at least a portion of the data communicated from the first application provider 710-1 to the first end customer 730-1), and other data will not be ASLP data.

In some embodiments, the system 700 further includes a data storage unit 740 (e.g., a server), configured to store certain ALS-related information. In certain embodiments, the data storage unit 740 stores the ASLA. In other embodiments, the data storage unit 740 also stores other service level information and other information that may be useful in formulating ASLP data. Information from the data storage unit 740 may be passed to an ASLP handler unit 760 for use in managing ASLP data traffic over the network.

In the illustrative embodiment, when data not under an ASLA flows through the network 720, the data may pass as best effort (i.e., neutral) traffic through some or all of the nodes of the network 720. If the network 720 detects data under an ASLA, however, the ASLP handler unit 760 may manage the network in an attempt to satisfy the ALS information relating to the transmission. For example, the ASLP handler unit 760 may allocate bandwidth, set priorities, or perform other network management functions according to the ASLA or other service level settings.

Figure 8:
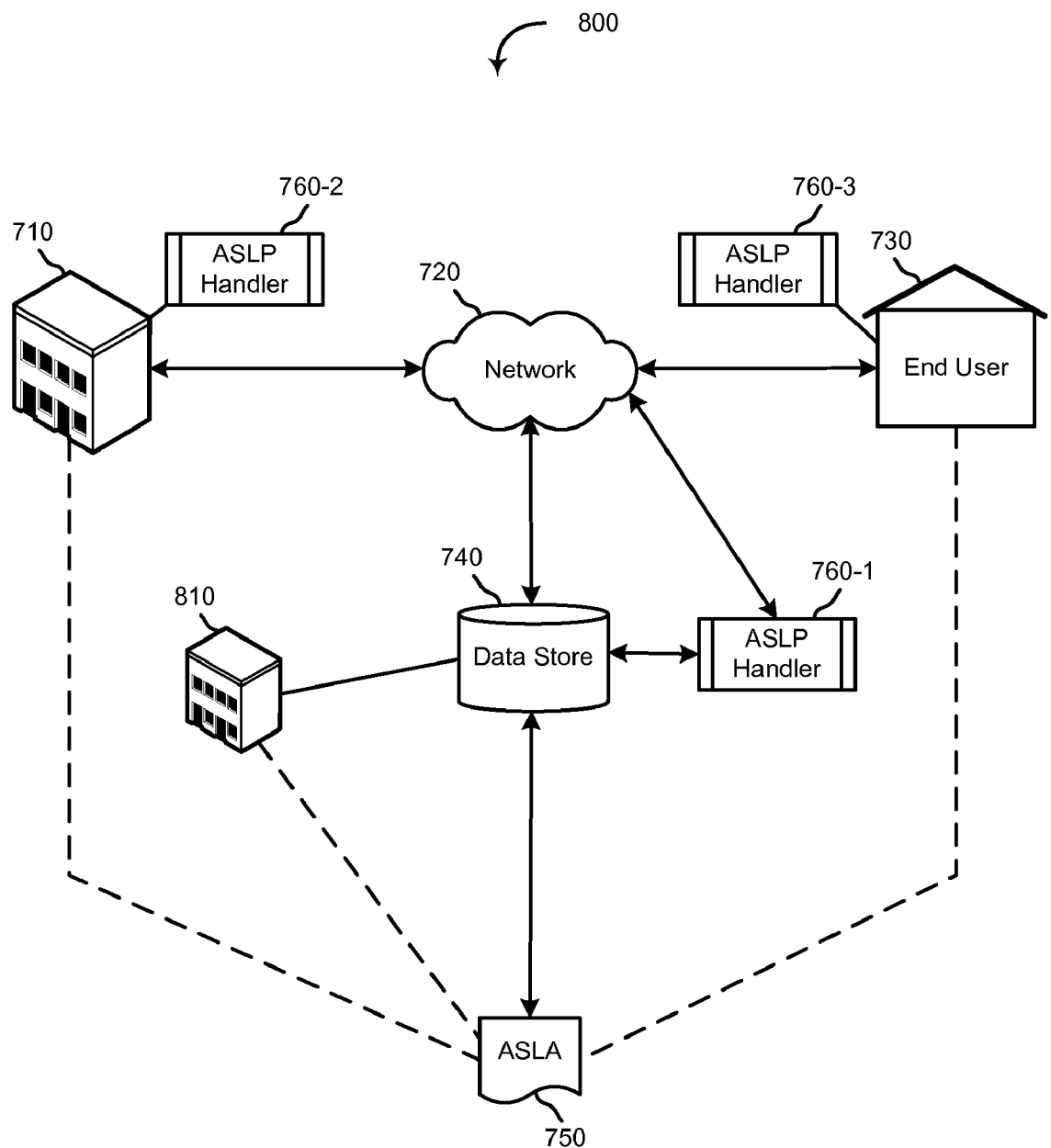
FIG. 8 shows a simplified system diagram of an illustrative system for providing ALS over a managed network using a number of distributed ASLP handler units, according to various embodiments of the invention.

FIG. 8 shows a simplified system diagram of an illustrative system for providing ALS over a managed network using a number of distributed ASLP handler units, according to various embodiments of the invention. For clarity, only a single application provider 710 and a single end customer 730 are shown. It will be appreciated, however, that in some embodiments, multiple application providers 710 and/or single end customers 730 may be connected by the network, and may or may not engage in ASLP data transmissions.

As in FIG. 7, the system 800 is shown with the application provider 710 and the end customer 730 communicating application data over a network 720. Further, the application provider 710 and the end customer 730 are parties to an ASLA 750. The ASLA, and possibly other information, is stored in a data storage unit 740, which is connected to an ASLP handler unit 760-1. In the embodiment illustrated in FIG. 8, the data storage unit 740 is controlled (e.g., owned, operated, managed, etc.) by a network resources provider 810. In certain embodiments, the network resources provider 810 manages all or part of the network. Further, in certain embodiments, the network resources provider 810 is a party to the ASLA (e.g., directly as a third-party to the ASLA, or indirectly by being a party to a separate but interrelated agreement with one or both of the parties to the ASLA).

In certain embodiments, a second ASLP handler unit 760-2 is located at the application provider 710 data origination location. The function of the second ASLP handler unit 760-2 may be to configure the outgoing application data as ASLP data according to the ASLP. It will be appreciated that the second ASLP handler unit 760-2 may be the same or different from the first ASLP handler unit 760-1. For example, where only this minimal functionality may be desired, the second ASLP handler unit 760-2 may be implemented as a software plug-in or other software application for appropriately formatting data into ASLP data.

In other embodiments, a third ASLP handler unit 760-3 is located at the end customer 730 data receiving location (e.g., the customer premises). The function of the third ASLP handler unit 760-3 may be to interpret or further handle incoming application data as ASLP data according to the ASLP. Of course, depending on the desired functionality of the third ASLP handler unit 760-3, the third ASLP handler unit 760-3 may be the same or different from either or both of the first ASLP handler unit 760-1 and the second ASLP handler unit 760-2. For example, the third ASLP handler unit 760-3 may be incorporated into a router at the end customer 730 premises, and may be configured to perform one or more ASLP-related functions, including interpreting ASLP data, handling the further transmission of ASLP data within the end customer's 730 local area network, interpreting tags or alerts, resending ASLP data back to the network 720, etc.

Figure 9:
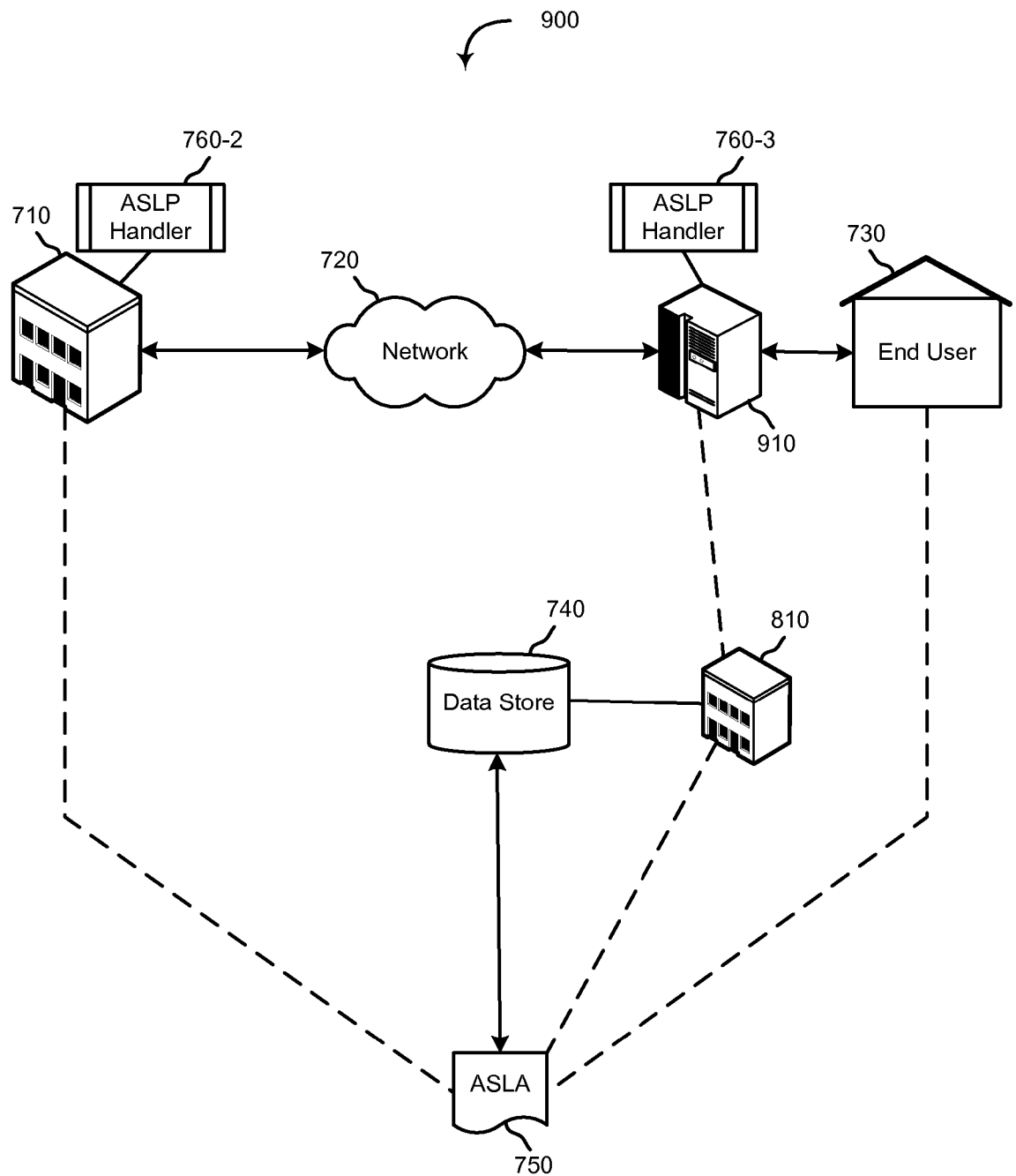
FIG. 9 shows a simplified system diagram of an illustrative system for providing ALS over a network having at least one managed network element, according to various embodiments of the invention.

FIG. 9 shows a simplified system diagram of an illustrative system for providing ALS over a network having at least one managed network element, according to various embodiments of the invention. It will be appreciated that the system 900 of FIG. 9 is substantially similar to the system 800 of FIG. 8, except in the relationship between the network resources provider 810 and the network 720. The system 900 includes a network element 910 located at the access network of the end customer 730. For example, if the end customer 730 is connected to the network 720 by a digital subscriber line ("DSL") connection, the network element 910 may be a Digital Subscriber Line Access Multiplexer ("DSLAM").

In certain embodiments, the network element 910 is controlled by the network resources provider 810 and includes, or has access to, an ASLP handler unit 760-3. Because a portion of the network 720 is controlled by the network resources provider 810, it may not be necessary for the data storage unit 740 or the ASLP handler unit 760-3 to be independently (e.g., directly) in communication with the network 720. For example, the network element 910 may operate to handle ASLP data through its own dedicated communication link (e.g., or direct connection) to either or both of the data storage unit 740 and the ASLP handler unit 760-3.

For example, when ASLP data reaches the network element 910, the ASLP handler unit 760-3 may interpret the ASLP information. The ASLP handler unit 760-3 may then use information stored in the data storage unit 740 to make a data handling determination. In some cases, after making the data handling determination, the ASLP handler unit 760-3 may generate new ASLP data for use by the network element 910. The network element 910 may then handle the ASLP data according to the new ASLP data, for example by routing the data to the end customer 730 according to service level settings associated with the end customer 730 and/or the application provider 710.

Figure 10:
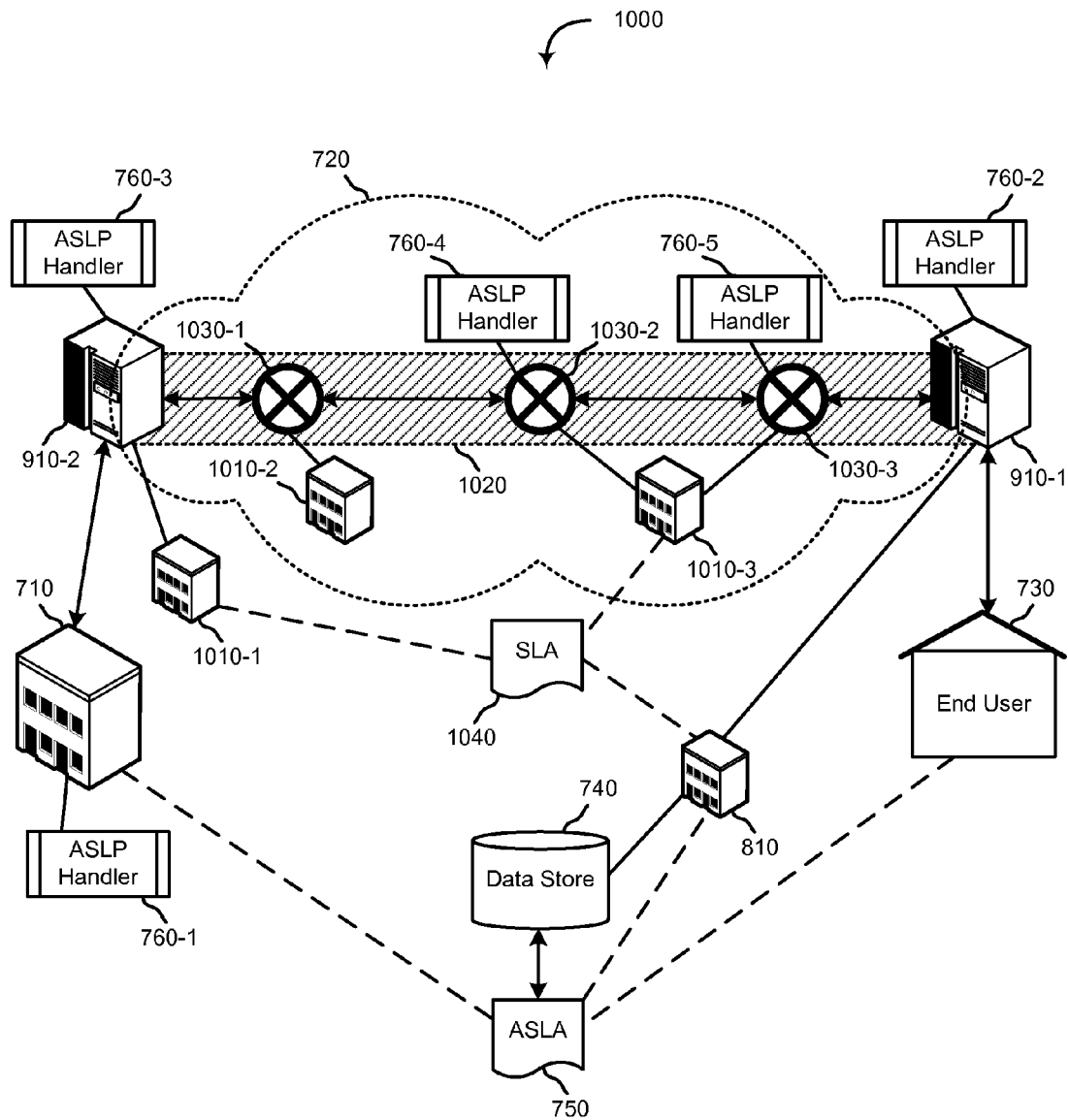
FIG. 10 shows a simplified system diagram of an illustrative system for providing ALS over a network having multiple network elements managed by multiple parties, according to various embodiments of the invention.

FIG. 10 shows a simplified system diagram of an illustrative system for providing ALS over a network having multiple network elements managed by multiple parties, according to various embodiments of the invention. As in FIG. 9, the method 1000 of FIG. 10 includes an application provider 710 and an end customer 730 connected via a network 720. A first network element 910-1, managed by a network resources provider 810, is located in the access network of the end customer 730. The first network element 910-1 may be operable to use an ASLP handler unit 760-3 and/or information from a data store 740 to interpret ASLP data destined for (or in some cases, originating from) the end customer 730.

In the embodiment illustrated in FIG. 10, the network 720 includes a number of network routing elements 1030 (e.g., switches). In some cases (e.g., depending on the ASLP and/or other protocols being used for data communications over the network 720), the various network routing elements 1030 between the application provider 710 and the end customer 730 may define a virtual communication link 1020 (e.g., a tunnel). Some or all of the network routing elements 1030 may be controlled by various entities 1010.

In certain embodiments, the entities are network resources providers, and the network resources provider 810 is one of the entities. Purely by way of example, a first entity 1010-1 may control a second network element 910-2, the second network element 910-2 being located in the access network of the application provider 710. A second entity 1010-2 may control a first network routing element 1030-1 on the backbone of the network 720. And a third entity 1010-3 may control a second network routing element 1030-2 and a third network routing element 1030-3, both on the backbone of the network 720.

It will be appreciated that some or all of the ASLP handling functionality may be provided at different network elements, for example, depending on their respective functions in the network. For example, a DSLAM may be connected to an aggregation device, which may aggregate traffic from the DSLAM and multiple other DSLAMs to be transported over a core network. An edge router may be integrated or separate from the aggregation device, and a core router may be upstream from the edge router. In some cases, ASLP handling functionality may be provided by any or all of these devices, depending on the capacity of various transport links. For example, the location of the ASLP handling functionality may be optimal where the likelihood of a traffic bottleneck is highest.

It will be further appreciated that many different types of relationships may exist between various parties in the system 1000. As illustrated, the network resources provider 810 has SLAs 1040 in place, governing relationships with the first entity 1010-1 and the third entity 1010-3. The SLAs 1040 may, for example, license those entities (1010-1 and 1010-3) to handle ASLP data, allow for sharing certain types of information (e.g., logging of certain types of traffic, sharing customer service level settings, sharing information regarding agreements with application providers, etc.), grant certain authorizations to the parties, etc. Of course, other relationships may exist, other than the ones illustrated in FIG. 10. For example, the second entity 1010-2 and the third entity 1010-3 may be parties to an SLA 1040 that does not involve the network resources provider 810, in the form of a second license, a sub-license, an assignment, a partnership, etc.

In certain embodiments, it is desirable for various network elements 910 and/or network routing elements 1030 to have localized ASLP handling functionality, e.g., through local ASLP handling units 760. For example, the second network element 910-2, the second network routing element 1030-2, and the third network routing element 1030-3 are all illustrated as having local ASLP handling units 760. This may allow for more efficient local management of ASLP traffic at various nodes in the network 720.

In one example, the application provider 710 transmits application data to the network 720, destined for the end customer 730. The application data is configured as ASLP data by the first ASLP handler unit 760-1 (local to the application provider 710), and routed to the second network element 910-2 at the edge of its access network. The second network element 910-2 has a local ASLP handling unit 760-3, which routes the application data according to the ASLP.

The application data may then be passed to the first network routing element 1030-1, which has no local ASLP handling capability and no SLA 1040 in place with the network resources provider 810. As such, the first network routing element 1030-1 may treat the ASLP data as any other data (e.g., with no priority, as best effort traffic). The application data may continue through the network, flowing through the second network routing element 1030-2 and the third network routing element 1030-3, both of which have local ASLP handling units (760-4 and 760-5, respectively). As such, the application data may be handled according to the ASLP at those network nodes.

The application data may then reach the first network element 910-1, located at the edge of the access network of the end customer 730. The first network element 910-1 may analyze the ASLP information in the ASLP data to make an appropriate network traffic management determination. For example, the first network element 910-1 may query the data storage unit 740 to determine what ASLA terms or conditions control the relationship between the application provider 710 and the end customer 730, if there are any other relevant service level settings for the account of the end customer 730, and any other relevant information. Using this information, the first network element 910-1 may handle the application data, for example by routing the data to the end customer 730 with the appropriate ALS.

It will be appreciated that the functionality of the various components of the system or the performance of various steps of the methods may be implemented in a number of ways. For example, they may be implemented in hardware, firmware, software, or in any other effective way. Further, they may be implemented as one or more dedicated devices, as one or more components of a larger device, as one or more components of a system, etc. In some embodiments, they are implemented as or in a computational system (e.g., a computer).

Figure 11:
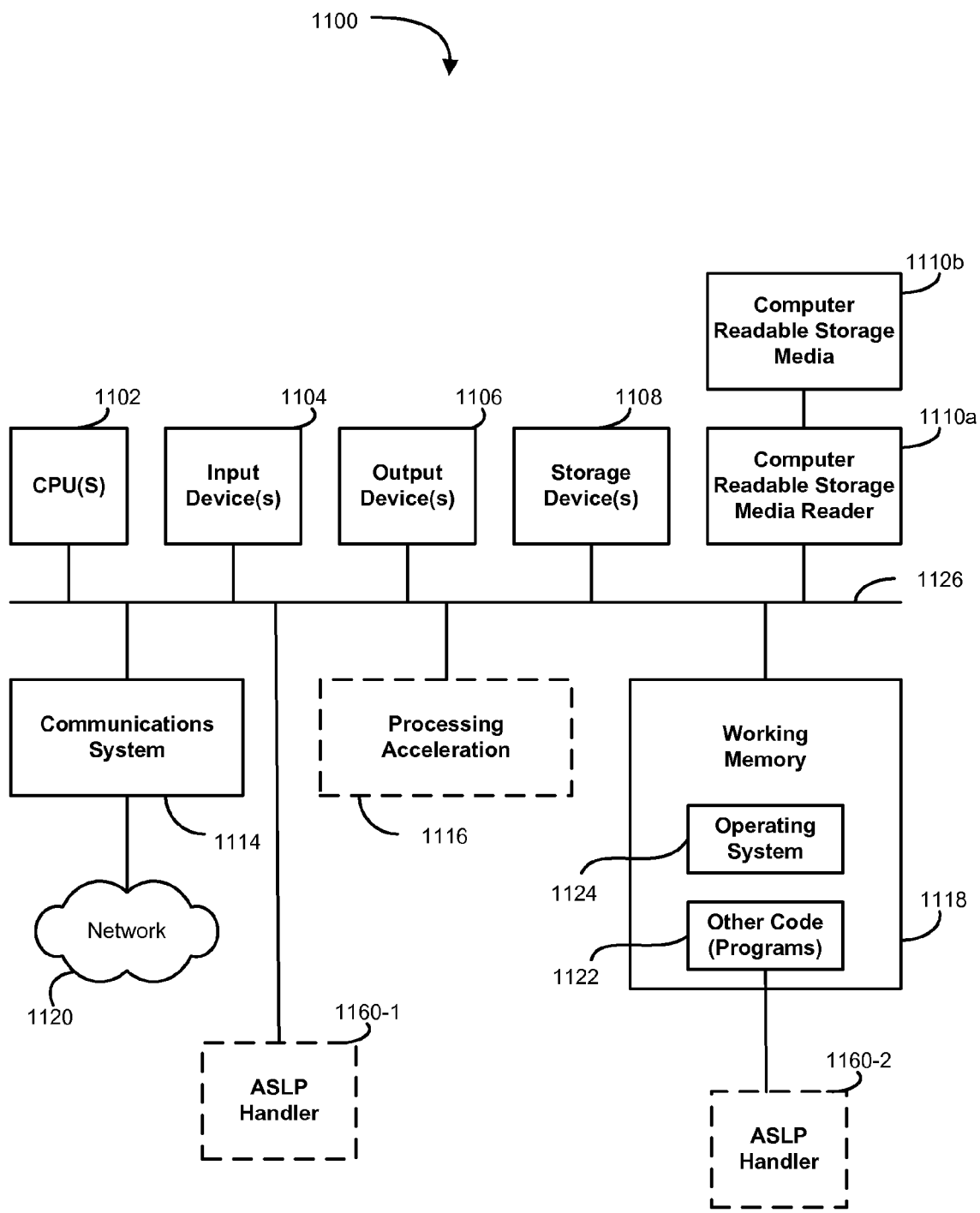
FIG. 11 shows an illustrative computational system for providing ALS support in a network environment, according to various embodiments of the invention.

FIG. 11 shows an illustrative computational system for providing ALS support in a network environment, according to various embodiments of the invention. The computational system 1100 is shown having hardware elements that may be electrically coupled via a bus 1126 (or may otherwise be in communication, as appropriate). The hardware elements may include one or more processors 1102, including without limitation one or more general-purpose processors and/or one or more special-purpose processors (such as digital signal processing chips, graphics acceleration chips, and/or the like); one or more input devices 1104, which can include without limitation a mouse, a keyboard, and/or the like; and one or more output devices 1106, which can include without limitation a display device, a printer, and/or the like. In some embodiments, an ASLP handling unit 1160-1 is coupled to the bus 1126, or is otherwise accessible by other components of the computational system 1100.

The computational system 1100 may further include (and/or be in communication with) one or more storage devices 1108, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like.

The computational system 1100 might also include a communications subsystem 1114, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 1114 may permit data to be exchanged with a network 1120, and/or any other devices described herein. In many embodiments, the computational system 1100 will further comprise a working memory 1118, which can include a RAM or ROM device, as described above.

The computational system 1100 also may include software elements, shown as being currently located within the working memory 1118, including an operating system 1124 and/or other code, such as one or more application programs 1122, which may include computer programs of the invention, and/or may be designed to implement methods of the invention and/or configure systems of the invention, as described herein. For example, the application programs 1122 may include functionality to implement some or all of the aspects of an ASLP handling unit 1160-2.

Merely by way of example, one or more procedures described with respect to the method(s) discussed above might be implemented as code and/or instructions executable by a computer (and/or a processor within a computer). A set of these instructions and/or code might be stored on a computer readable storage medium 1110b. In some embodiments, the computer readable storage medium 1110b is the storage device(s) 1108 described above. In other embodiments, the computer readable storage medium 1110*b* might be incorporated within a computational system, such as the system 1100. In still other embodiments, the computer readable storage medium 1110*b* might be separate from the computational system (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 1100 and/or might take the form of source and/or installable code, which, upon compilation and/or installation on the computational system 1100 (e.g., using any of a variety of generally available compilers, installation programs, compression/decompression utilities, etc.), then takes the form of executable code. In these embodiments, the computer readable storage medium 1110*b* may be read by a computer readable storage media reader 1110*a*.

In one embodiment, the invention employs the computational system to perform methods of the invention. According to a set of embodiments, some or all of the procedures of such methods are performed by the computational system 1100 in response to processor 1102 executing one or more sequences of one or more instructions (which might be incorporated into the operating system 1124 and/or other code, such as an application program 1122) contained in the working memory 1118. Such instructions may be read into the working memory 1118 from another machine-readable medium, such as one or more of the storage device(s) 1108 (or 1110). Merely by way of example, execution of the sequences of instructions contained in the working memory 1118 might cause the processor(s) 1102 to perform one or more procedures of the methods described herein. In this way, the computational system 1100 can be "configured to" or "operable to" perform any number of such procedures or methods.

The terms "machine readable medium" and "computer readable medium," as used herein, refer to any medium that participates in providing data that causes a machine to operate in a specific fashion. In an embodiment implemented using the computational system 1100, various machine-readable media might be involved in providing instructions/code to processor(s) 1102 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (1108 or 1110). Volatile media includes, without limitation dynamic memory, such as the working memory 1118. Transmission media includes coaxial cables, copper wire, and fiber optics, including the wires that comprise the bus 1126, as well as the various components of the communication subsystem 1114 (and/or the media by which the communications subsystem 1114 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1102 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 1100. These signals, which might be in the form of electromagnetic signals, acoustic signals, optical signals, and/or the like, are all examples of carrier waves on which instructions can be encoded, in accordance with various embodiments of the invention.

The communications subsystem 1114 (and/or components thereof) generally may receive the signals, and the bus 1126 then may carry the signals (and/or the data, instructions, etc. carried by the signals) to the working memory 1118, from which the processor(s) 1102 may retrieve and execute the instructions. The instructions received by the working memory 1118 may optionally be stored on a storage device 1108 either before or after execution by the processor(s) 1102.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for providing an application level of service over a network, the method comprising:
receiving network traffic at a network routing location controlled by a service provider, wherein the network traffic:
originates from an application;
comprises protocol data; and
is configured to be sent over the network to an intended consumer, the intended consumer being a consumer of network resources provided by the service provider;
deriving the application and the intended consumer from the network traffic as a function of the protocol data;
determining whether an application service level relationship exists between the application and the intended consumer;
handling the network traffic at the network routing location as a function of the results of the determining step;
wherein determining whether an application service level relationship exists comprises determining whether the application is a registered application; and
wherein handling the network traffic comprises routing the network traffic according to a default application level of service when the application is not a registered application.

2. The method of claim 1,
wherein determining whether an application service level relationship exists comprises determining whether the application is a restricted application; and
wherein handling the network traffic comprises handling the network traffic according to a restricted application level of service when the application is a restricted application.

3. The method of claim 2,
wherein the restricted application level of service comprises inhibiting routing of the network traffic.

4. The method of claim 2, further comprising:
when the application provider is a restricted application:
notifying the intended user that network traffic is being sent from a restricted application.

5. The method of claim 4, further comprising:
when the application is a restricted application:
prompting the intended user to alter restrictions with respect to the application.

6. The method of claim 1, further comprising:
retrieving service level settings relating to the intended customer,
wherein handling the network traffic at the network routing location is performed further as a function of the retrieved service level settings.

7. The method of claim 6,
wherein the service level settings comprise a set of bandwidth allocations for allocating bandwidth to the indented user by the network resources provider.

8. The method of claim 6,
wherein the service level settings are stored in a data storage device.

9. The method of claim 6,
wherein the service level settings are configured to be modified by an automatic configuration server.

10. A method for providing an application level of service over a network, the method comprising:
receiving network traffic at a network routing location controlled by a service provider, wherein the network traffic:
originates from an application;
comprises protocol data; and
is configured to be sent over the network to an intended consumer, the intended consumer being a consumer of network resources provided by the service provider;
deriving the application and the intended consumer from the network traffic as a function of the protocol data;
determining whether an application service level relationship exists between the application and the intended consumer;
handling the network traffic at the network routing location as a function of the results of the determining step;
wherein determining whether an application service level relationship exists comprises determining whether an application service level agreement exists between the application and the intended user; and
wherein handling the network traffic comprises routing the network traffic according to the application service level agreement when the application service level agreement exists.

11. The method of claim 3,
wherein handling the network traffic comprises routing the network traffic according to a service level agreement between the application provider and the network resources provider when the application service level agreement does not exist.

12. The method of claim 10,
wherein handling the network traffic comprises routing the network traffic according to a default application level of service when the application service level agreement does not exist.

13. The method of claim 10, further comprising:
when the application service level agreement does not exist:
notifying the intended user that the application service level agreement does not exist; and
prompting the intended user to enter a new application service level agreement with the application provider.

14. A method for providing an application level of service over a network, the method comprising:
providing a list of registered applications to a user of network resources;
receiving a request from the user to accommodate an application level of service for network traffic from a designated registered application;
generating, if the request is proper, an application service level agreement based on the request between the user and the designated registered application;
receiving network traffic from the network at a first network location;
determining whether the network traffic is governed by the application service level agreement; and
if the network traffic is governed by the application service level agreement:
formulating application routing data as a function of the application service level agreement and an application service level protocol; and
routing the network traffic over the network from the first network location to a second network location according to the application routing data.

15. The method of claim 14, wherein the application level of service relates to a bandwidth reservation.

16. The method of claim 14, wherein the application level of service relates to at least one of quality of service, class of service, or terms of service.

17. The method of claim 14, wherein the user of network resources comprises a consumer of network services.

18. The method of claim 14, wherein the user of network resources comprises a network component.

19. The method of claim 18, wherein the network component comprises at least one of a modem, a router, a residential gateway, or a network switch.

20. The method of claim 14, further comprising:
authenticating the user prior to the generating step.

21. The method of claim 14, further comprising:
auditing the request to determine whether the request is proper.

22. The method of claim 21, wherein the auditing step comprises:
receiving a set of network entitlements relating to the user; and
determining whether the request is proper as a function of the set of network entitlements.

23. The method of claim 21, wherein the auditing step comprises:
receiving a set of network characteristics relating to the network; and
determining whether the request is proper as a function of the set of network characteristics.

24. The method of claim 14, further comprising:
accessing service level settings relating to the user; and
modifying the service level settings as a function of the application service level agreement.

25. The method of claim 24, wherein the application routing data is further formulated as a function of the service level settings.

26. The method of claim 14, further comprising:
receiving a request for registration of an application from an application provider;
determining whether to accept the request for registration; and
adding the application to the list of registered applications when the request for registration is accepted.

27. The method of claim 26, wherein:
the network resources are provided by a network service provider; and
the determining whether to accept the request for registration is performed by the network service provider.

28. The method of claim 14, further comprising:
receiving a request for registration of an application from the user;
determining whether to accept the request for registration; and
adding the application to the list of registered applications when the request for registration is accepted.

29. The method of claim 28, wherein determining whether to accept the request for registration comprises prompting an application provider associated with the application to register the application.

30. The method of claim 14, further comprising:
receiving network traffic from an application, wherein the application is not a registered application; and
notifying the user that network traffic was received from a non-registered application.

31. The method of claim 14, further comprising:
receiving network traffic from an application, wherein the application is a registered application and no application service level agreement has been generated between the application and the user; and
notifying the user that network traffic was received from a registered application with which no application service level agreement has been generated.

32. The method of claim 31, further comprising:
prompting the user to request to accommodate an application level of service for network traffic from the registered application.

33. The method of claim 14, further comprising:
storing the application service level agreement in a data storage unit.

34. A system for providing an application level of service over a network, the system comprising:
a receiver unit, operable to receive network traffic from the network, wherein the network traffic originates from at least one of a set of registered applications and is destined for an intended user; and
a network management unit, operable to:
determine whether the network traffic is governed by an application service level relationship between the at least one registered application and the intended user;
formulate application routing data as a function of the application service level relationship and an application service level protocol; and
route the network traffic over the network at least partially as a function of the application routing data;
a data storage unit, operable to store service level settings, wherein a portion of the service level settings relate to application service level relationships between the intended user and at least a portion of the set of registered applications.

35. The system of claim 34, further comprising:
a remote configuration unit, operable to remotely configure a network component of the intended user as a function of the service level settings relating to the intended user.

* * * * *